US008134831B1

(12) United States Patent
Hernandez

(10) Patent No.: US 8,134,831 B1
(45) Date of Patent: Mar. 13, 2012

(54) ACCESSORIZED LAPTOP COMPUTER APPARATUS

(76) Inventor: Islay Hernandez, Hialeah, FL (US)

( * ) Notice: Subject to any disclaimer, the term of this patent is extended or adjusted under 35 U.S.C. 154(b) by 305 days.

(21) Appl. No.: 12/611,327

(22) Filed: Nov. 3, 2009

(51) Int. Cl.
*G06F 1/16* (2006.01)

(52) U.S. Cl. ................................................. 361/679.55

(58) Field of Classification Search ............... 361/679.55
See application file for complete search history.

(56) References Cited

U.S. PATENT DOCUMENTS

| | | | | | |
|---|---|---|---|---|---|
| 4,680,674 | A | * | 7/1987 | Moore | 361/679.32 |
| 4,788,658 | A | * | 11/1988 | Hanebuth | 361/679.41 |
| 4,839,837 | A | * | 6/1989 | Chang | 361/679.09 |
| 5,115,374 | A | * | 5/1992 | Hongoh | 361/679.09 |
| 5,214,574 | A | * | 5/1993 | Chang | 361/679.09 |
| 5,242,056 | A | * | 9/1993 | Zia et al. | 206/576 |
| 5,260,885 | A | * | 11/1993 | Ma | 361/679.26 |
| D344,720 | S | * | 3/1994 | Inukai | D14/323 |
| 5,345,403 | A | * | 9/1994 | Ogawa et al. | 361/679.26 |
| 5,364,196 | A | * | 11/1994 | Baitz et al. | 400/691 |
| 5,386,298 | A | * | 1/1995 | Bronnenberg et al. | 358/403 |
| D358,136 | S | * | 5/1995 | Samuelson | D14/315 |
| 5,479,269 | A | * | 12/1995 | Bronnenberg et al. | 358/403 |
| 5,555,489 | A | * | 9/1996 | Keskinen | 361/679.55 |
| 5,845,144 | A | * | 12/1998 | Tateyama et al. | 712/1 |
| 6,078,407 | A | * | 6/2000 | Ma | 358/474 |
| 6,081,207 | A | * | 6/2000 | Batio | 341/20 |
| 6,134,105 | A | * | 10/2000 | Lueker | 361/679.41 |
| 6,219,227 | B1 | * | 4/2001 | Trane | 361/679.27 |
| 6,219,229 | B1 | * | 4/2001 | Lee | 361/679.08 |
| 6,320,974 | B1 | * | 11/2001 | Glaze et al. | 382/115 |
| 6,362,954 | B1 | * | 3/2002 | LeVander | 190/102 |
| 6,421,235 | B2 | * | 7/2002 | Ditzik | 361/679.3 |
| 6,781,823 | B1 | * | 8/2004 | Nyack | 361/679.29 |
| D531,175 | S | * | 10/2006 | Moskaluk et al. | D14/300 |
| D639,802 | S | * | 6/2011 | Brooks | D14/315 |
| 2002/0027767 | A1 | * | 3/2002 | Ryder | 361/683 |
| 2005/0237705 | A1 | * | 10/2005 | Moskaluk et al. | 361/683 |
| 2009/0021797 | A1 | * | 1/2009 | Luciano | 358/474 |
| 2009/0091885 | A1 | * | 4/2009 | Burford | 361/679.55 |
| 2010/0118327 | A1 | * | 5/2010 | Caspar et al. | 358/1.13 |
| 2011/0019360 | A1 | * | 1/2011 | Thabit | 361/679.55 |
| 2011/0122575 | A1 | * | 5/2011 | Haren | 361/679.55 |

\* cited by examiner

*Primary Examiner* — Lisa Lea Edmonds

(74) *Attorney, Agent, or Firm* — Albert Bordas, P.A.

(57) ABSTRACT

The accessorized laptop computer apparatus provides multiple features within a size comparable to typical laptops computers. A user can print contracts and other documents and also scan documents into the memory of the CPU. A user can swipe a credit card or other readable magnetic strip card and either store the information within the apparatus or use the telephone dial pad to call for approval of a card expenditure, or both. A user can also place other telephone calls. The apparatus provides true office portability not heretofore available.

3 Claims, 3 Drawing Sheets

ACCESSORIZED LAPTOP COMPUTER APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

There are times when a portable laptop computer is far more useful than a stationary computer. In real estate work and contract work, for example, a user can accomplish more with a laptop on a particular jobsite or remote location. A problem has existed, though, in that a laptop user cannot perform many tasks that are typically done in an office. Printing a contract, scanning information, or even swiping a credit card are tasks that usually require a user to return to an office or storefront location or the like. Trying to transport such devices on a daily basis, along with a portable laptop computer, is not realistically viable. What has been needed is an actual laptop computer, sized accordingly, that includes a printer with paper tray, a scanner, and credit card swipe capabilities, thereby enabling a user to perform necessary tasks with true mobility. Telephone capability has also been needed. The present apparatus provides such capabilities.

FIELD OF THE INVENTION

The accessorized laptop computer apparatus relates to laptop computers and more especially a laptop computer that is sized accordingly and includes printer, scanner, and credit card swipe, and telephone capabilities.

SUMMARY OF THE INVENTION

The general purpose of the accessorized laptop computer apparatus, described subsequently in greater detail, is to provide a accessorized laptop computer apparatus which has many novel features that result in an improved accessorized laptop computer apparatus which is not anticipated, rendered obvious, suggested, or even implied by prior art, either alone or in combination thereof.

To attain this, the accessorized laptop computer apparatus provides multiple features within a size comparable to typical laptops computers. The length and width are similar to most laptops, with the length being about 14 inches and the width about 11 inches. Only the thickness of the apparatus exceeds most typical laptop computers, thereby enabling the present apparatus to be truly portable and useful as a laptop. Additionally, the present apparatus importantly hingedly attaches the top to the back of the base top, a design most accepted by laptop users.

A user can print contracts and other documents and also scan documents into the memory of the CPU. A user can swipe a credit card or other readable magnetic strip card and either store the information within the apparatus or use the telephone dial pad to call for approval of a card expenditure, or both. A user can also place other telephone calls and send and receive FAX. The apparatus provides true office portability not heretofore available.

Thus has been broadly outlined the more important features of the improved accessorized laptop computer apparatus so that the detailed description thereof that follows may be better understood and in order that the present contribution to the art may be better appreciated.

An object of the accessorized laptop computer apparatus is to provide multiple features not typically incorporated into a laptop.

Still another object of the accessorized laptop computer apparatus is to fully integrate all accessorized features within a laptop computer framework.

Another object of the accessorized laptop computer apparatus is to be sized similarly to typical laptop computers.

A further object of the accessorized laptop computer apparatus is to provide a printer within the laptop computer.

An added object of the accessorized laptop computer apparatus is to provide a scanner within the laptop computer.

And, an object of the accessorized laptop computer apparatus is to provide a paper tray within the laptop computer.

Yet another object of the accessorized laptop computer apparatus is to provide credit card acceptance capability.

An added object of the accessorized laptop computer apparatus is to provide a FAX.

Still another object of the accessorized laptop computer apparatus is to provide a hinged top that hingedly attaches at the top of the laptop base back, similar to virtually all laptop computers.

These together with additional objects, features and advantages of the improved accessorized laptop computer apparatus will be readily apparent to those of ordinary skill in the art upon reading the following detailed description of presently preferred, but nonetheless illustrative, embodiments of the improved accessorized laptop computer apparatus when taken in conjunction with the accompanying drawings.

In this respect, before explaining the current embodiments of the improved accessorized laptop computer apparatus in detail, it is to be understood that the accessorized laptop computer apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved accessorized laptop computer apparatus. It is therefore important that the claims be regarded as including such equivalent constructions insofar as they do not depart from the spirit and scope of the accessorized laptop computer apparatus. It is also to be understood that the phraseology and terminology employed herein are for purposes of description and should not be regarded as limiting.

DETAILED DESCRIPTION OF THE DRAWINGS

Figure 1:
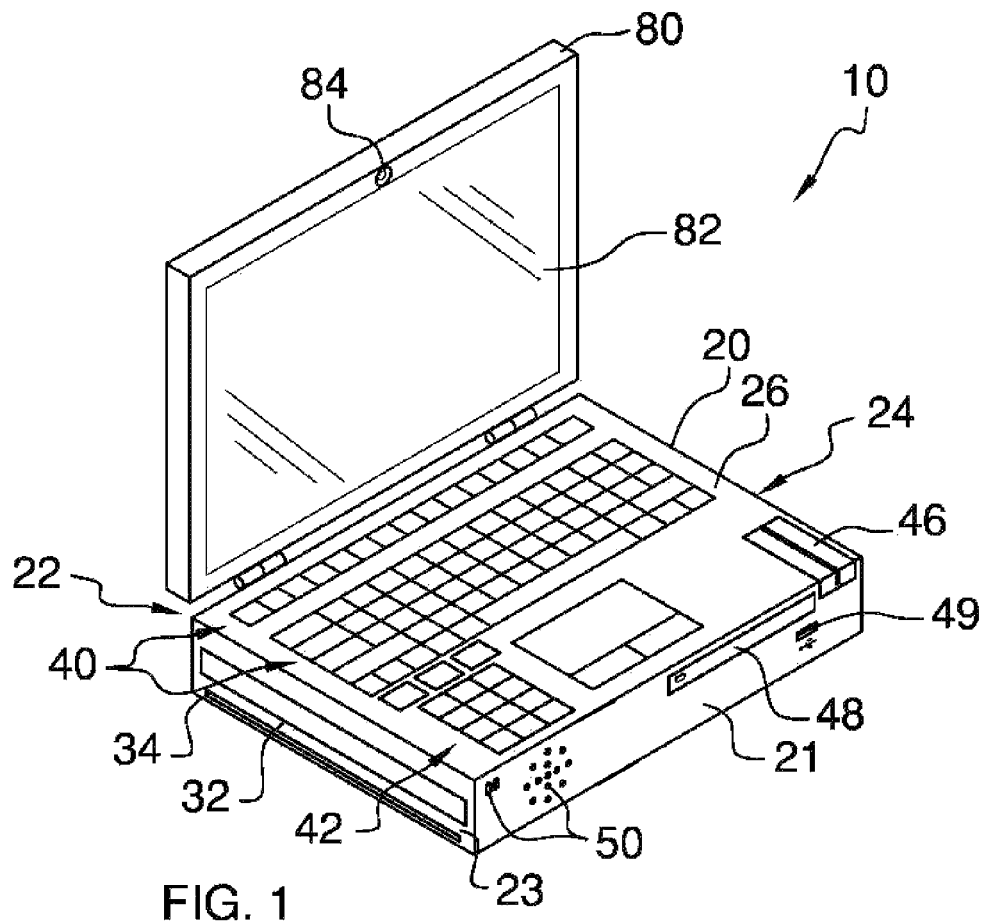
FIG. 1 is a frontal perspective view.
Figure 2:
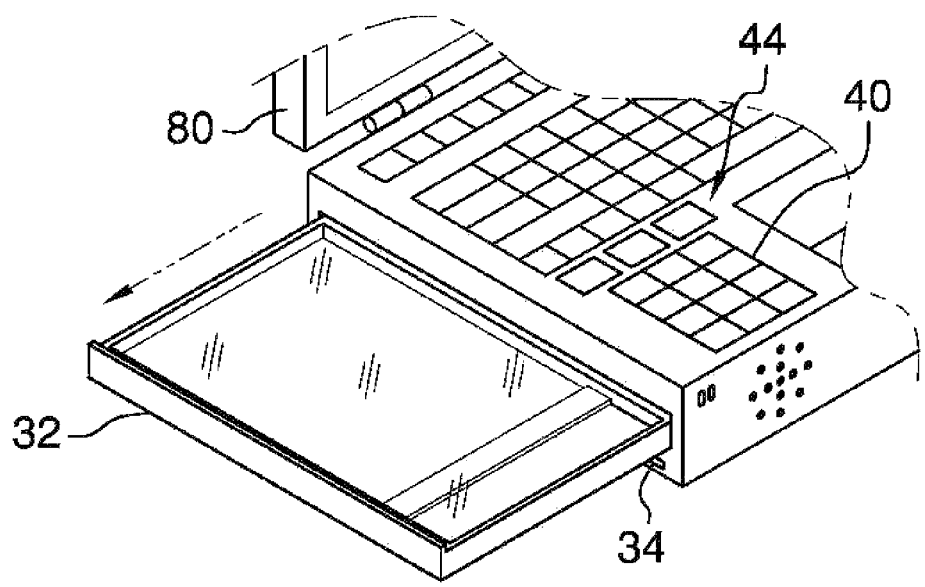
FIG. 2 is a partial frontal perspective view featuring the scanner within the laptop base.

With reference now to the drawings, and in particular FIGS. 1 through 5 thereof, the principles and concepts of the accessorized laptop computer apparatus generally designated by the reference number 10 will be described. Referring to FIGS. 1 and 2, the apparatus 10 partially comprises the laptop base 20 having a front 21 spaced apart from the back 22, a first end 23 spaced apart from the second end 24, and a flat top 26. The hinged cover 80 is importantly attached to the laptop base 20 top 26 back 22 and therefore typifies the most accepted format for laptop computers, with the view screen 82 and a camera 84. The typical keypad 40 is disposed in the laptop base 20 top 26.

Figure 4:
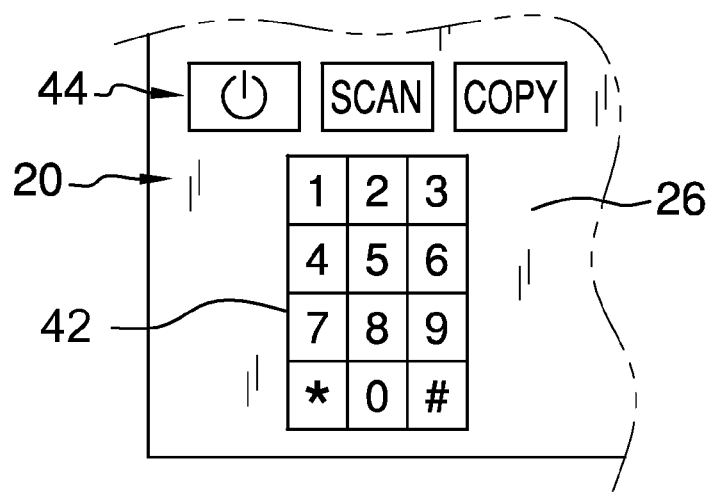
FIG. 4 is a partial top view of the laptop base.

Referring to FIG. 4, the telephone dial pad 42 is disposed in the laptop base 20 top 26 proximal to the front 21. The print, scan, copy controls 44 are disposed within the top 26 proximal to the front 21.

Figure 3:
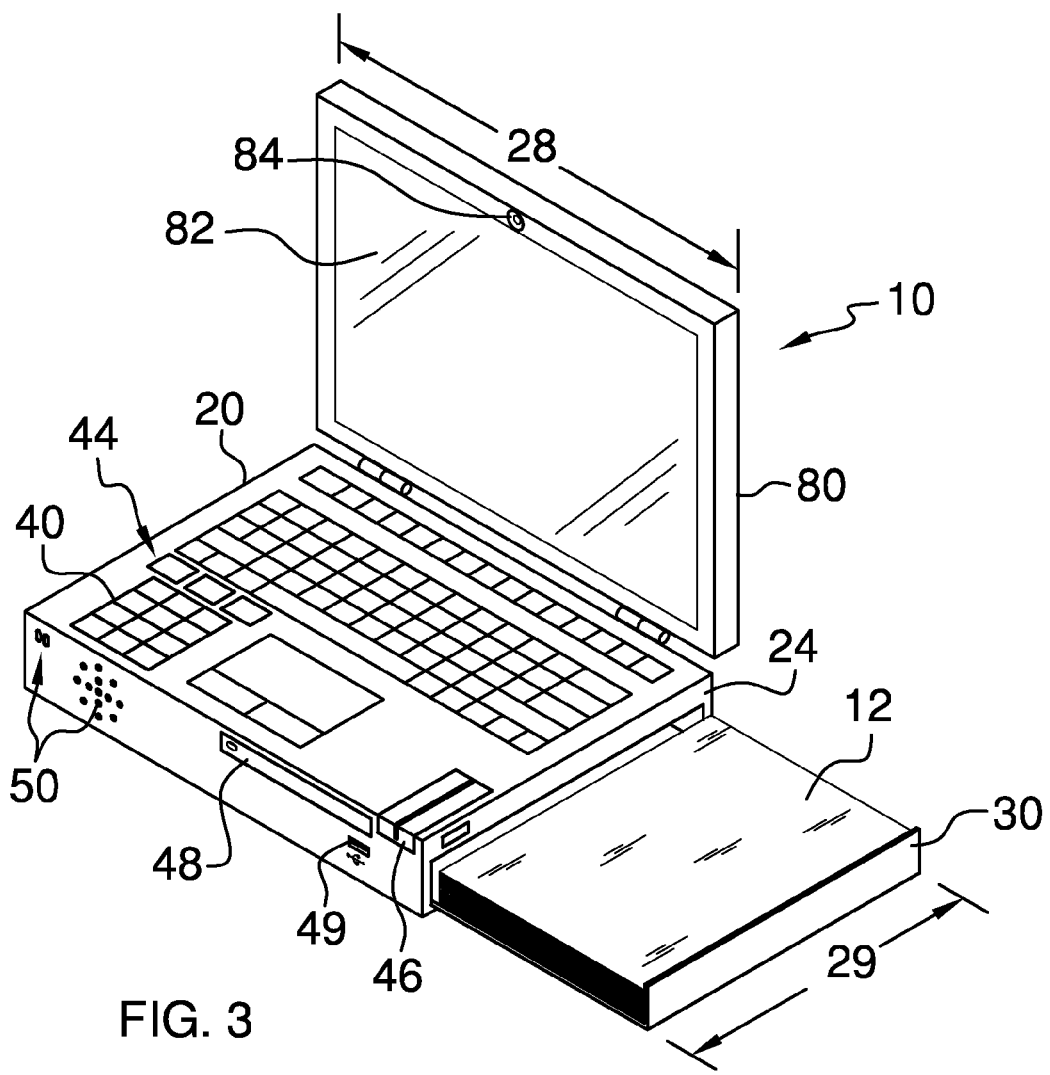
FIG. 3 is a frontal perspective view featuring the paper tray pullout function.

Referring again to FIG. 2 and also to FIG. 3, the apparatus 10 importantly comprises a length 28 of about 14 inches and a width 29 of about 11 inches. The apparatus 10 therefore has the same dimensions as most other laptops that do not possess the features enjoyed by the current apparatus 10. The features are importantly fully integrated into the dimensions and shape of a typical laptop, with only a slight increase in thickness. The credit card swipe 46 is disposed within the top 26 front 21. The speaker/mic 50 is disposed within the front 21. The CD player 48 is disposed within the front 21. The USB port 49 is disposed within the front 21. The scanner 32 is disposed within the first side 23. The printer output 34 is disposed within the first side 23 below the scanner 32. The paper tray 30 is disposed within the second side 24 and holds existing paper 12.

Figure 5:
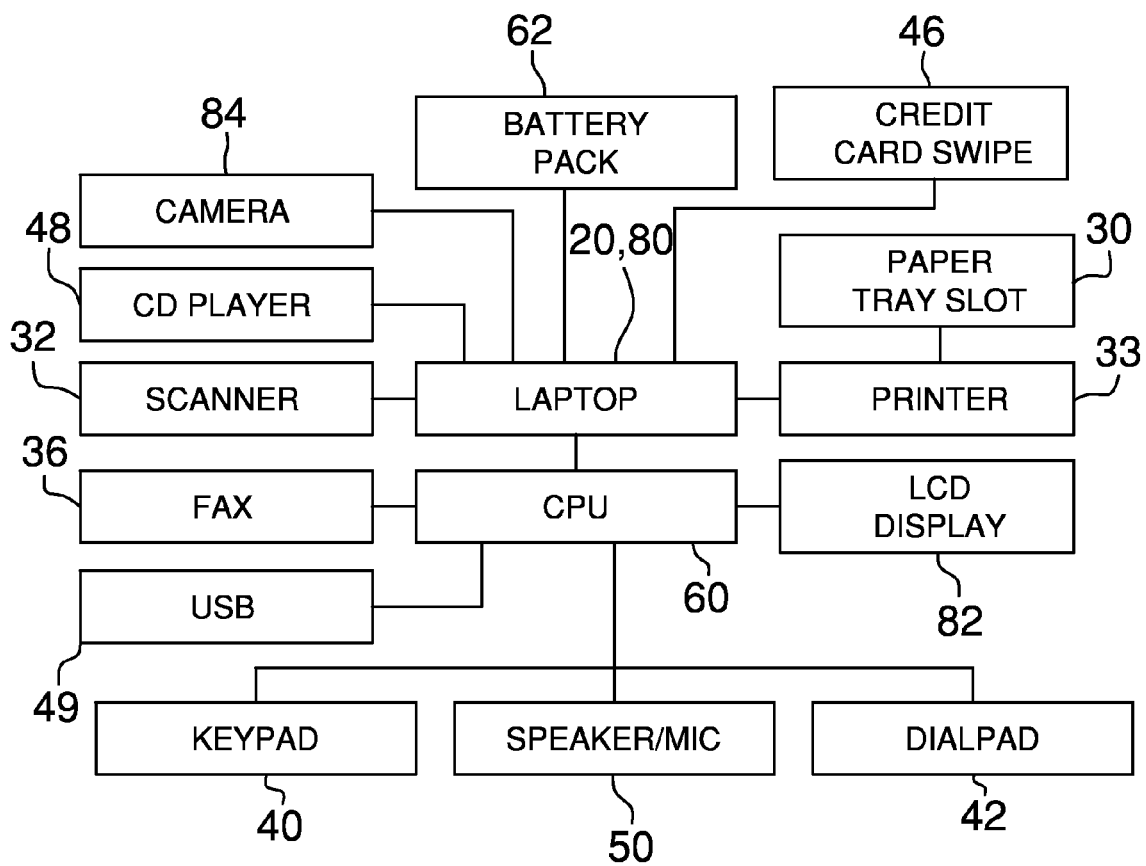
FIG. 5 is a schematic block diagram of the electronics of the apparatus.

Referring to FIG. 5 and also to FIGS. 1 and 2, the CPU 60 is disposed within the laptop base 20. The FAX 36 is also disposed within the laptop base 20 and is in communication with the dial pad 42. The CPU 60 is in communication with the keypad 40, the telephone dial pad 42, the print scan copy controls 44, the credit card swipe 46, the speaker/mic 50, the CD player 48, the FAX 36, the USB port 49, the printer 33, the view screen 82, the camera 84, and the battery pack 62.

With respect to the above description then, it is to be realized that the optimum dimensional relationships for the parts of the accessorized laptop computer apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the accessorized laptop computer apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the accessorized laptop computer apparatus may be used.

Therefore, the foregoing is considered as illustrative only of the principles of the accessorized laptop computer apparatus. Further, since numerous modifications and changes will readily occur to those skilled in the art, it is not desired to limit the accessorized laptop computer apparatus to the exact construction and operation shown and described, and accordingly, all suitable modifications and equivalents may be resorted to, falling within the scope of the accessorized laptop computer apparatus.

What is claimed is:

1. An accessorized laptop computer apparatus comprising, in combination:
   a length of 14 inches;
   a width of 11 inches;
   a laptop base having a front spaced apart from a back, a first end spaced apart from a second end, and a flat top;
   a hinged cover attached to the laptop base top back, the hinged cover further comprising:
   a view screen (82),
   a camera (84),
   a battery pack (62),
   a keypad disposed in the laptop base top;
   a print, scan, copy controls disposed within the top proximal to the front;
   a CD player disposed within the front;
   a FAX disposed within the laptop base;
   a USB port disposed within the front;
   a printer disposed within the laptop base;
   a printer output disposed within the first side below the scanner, the printer output in communication with the printer;
   a paper tray disposed within the second side, the paper tray in communication with the printer and printer output;
   a CPU disposed within the laptop base, the CPU in communication with the keypad, the print, scan copy controls, the CD player, the FAX, the USB port, the printer (33), the view screen (82), the camera (84), and the battery pack (62).

2. An accessorized laptop computer apparatus comprising, in combination:
   a length of 14 inches;
   a width of 11 inches;
   a laptop base having a front spaced apart from a back, a first end spaced apart from a second end, and a flat top;
   a hinged cover attached to the laptop base top back, the hinged cover further comprising:
   a view screen (82),
   a camera (84),
   a battery pack (62),
   a keypad disposed in the laptop base top;
   a telephone dial pad disposed in the laptop base top proximal to the front;
   a print, scan, copy controls disposed within the top proximal to the front;
   a speaker/mic disposed within the front, the speaker/mic in communication with the telephone dial pad;
   a CD player disposed within the front;
   a FAX disposed within the laptop base;
   a USB port disposed within the front;
   a scanner disposed within the first side;
   a printer disposed within the laptop base;
   a printer output disposed within the first side below the scanner, the printer output in communication with the printer;
   a paper tray disposed within the second side, the paper tray in communication with the printer and printer output;
   a CPU disposed within the laptop base, the CPU in communication with the keypad, the telephone dial pad, the print, scan copy controls, the speaker/mic, the CD player, the FAX, the USB port, the printer, the view screen (82), the camera (84), and the battery pack (62).

3. An accessorized laptop computer apparatus comprising, in combination:
- a length of 14 inches;
- a width of 11 inches;
- a laptop base having a front spaced apart from a back, a first end spaced apart from a second end, and a flat top;
- a hinged cover attached to the laptop base top back, the cover further comprising:
- a view screen (82);
- a camera;
- a battery pack;
- a keypad disposed in the laptop base top;
- a telephone dial pad disposed in the laptop base top proximal to the front;
- a print, scan, copy controls disposed within the top proximal to the front;
- a credit card swipe disposed within the top front;
- a speaker/mic disposed within the front, the speaker/mic in communication with the telephone dial pad;
- a CD player disposed within the front;
- a FAX disposed within the laptop base;
- a USB port disposed within the front;
- a scanner disposed within the first side;
- a printer disposed within the laptop base;
- a printer output disposed within the first side below the scanner, the printer output in communication with the printer;
- a paper tray disposed within the second side;
- a CPU disposed within the laptop base, the CPU in communication with the keypad, the telephone dial pad, the print, scan copy controls, the credit card swipe, the speaker/mic, the CD player, the FAX, the USB port, the printer, the view screen (82), the camera (84), and the battery pack (62).

* * * * *